US007965291B1

(12) United States Patent
Uralsky

(10) Patent No.: US 7,965,291 B1
(45) Date of Patent: Jun. 21, 2011

(54) ISOSURFACE EXTRACTION UTILIZING A GRAPHICS PROCESSING UNIT

(75) Inventor: Yury Y. Uralsky, Moscow (RU)

(73) Assignee: Nvidia Corporation, Santa Clara, CA (US)

( * ) Notice: Subject to any disclaimer, the term of this patent is extended or adjusted under 35 U.S.C. 154(b) by 515 days.

(21) Appl. No.: 11/556,664

(22) Filed: Nov. 3, 2006

(51) Int. Cl.
    *G06T 15/50*     (2011.01)
    *G06T 15/60*     (2006.01)
    *G06T 17/20*     (2006.01)

(52) U.S. Cl. .......................................... 345/426; 345/423
(58) Field of Classification Search .................. 345/419, 345/423, 426
See application file for complete search history.

(56) References Cited

U.S. PATENT DOCUMENTS

| | | | | |
|---|---|---|---|---|
| 5,559,935 A * | 9/1996 | Itoh et al. | 345/424 |
| 5,742,293 A * | 4/1998 | Koyamada et al. | 345/421 |
| 5,995,111 A * | 11/1999 | Morioka et al. | 345/592 |
| 6,377,865 B1 * | 4/2002 | Edelsbrunner et al. | 700/98 |
| 6,396,494 B1 * | 5/2002 | Pittet | 345/423 |
| 6,445,390 B1 * | 9/2002 | Aftosmis et al. | 345/421 |
| 6,545,676 B1 * | 4/2003 | Ryan et al. | 345/423 |
| 6,578,197 B1 * | 6/2003 | Peercy et al. | 717/143 |
| 6,664,962 B1 * | 12/2003 | Komsthoeft et al. | 345/426 |
| 6,765,584 B1 * | 7/2004 | Wloka et al. | 345/584 |
| 6,852,081 B2 * | 2/2005 | Sumanaweera et al. | 600/443 |
| 6,900,810 B1 * | 5/2005 | Moreton et al. | 345/522 |
| 6,909,913 B2 * | 6/2005 | Vining | 600/407 |
| 6,930,682 B1 * | 8/2005 | Livingston | 345/420 |
| 7,006,101 B1 * | 2/2006 | Brown et al. | 345/561 |
| 7,148,890 B2 * | 12/2006 | Rice et al. | 345/427 |
| 2003/0052875 A1 * | 3/2003 | Salomie | 345/419 |
| 2004/0012563 A1 * | 1/2004 | Papakipos et al. | 345/157 |
| 2004/0012596 A1 * | 1/2004 | Allen et al. | 345/501 |
| 2004/0095348 A1 * | 5/2004 | Bleiweiss et al. | 345/426 |
| 2004/0169650 A1 * | 9/2004 | Bastos et al. | 345/426 |
| 2004/0181115 A1 * | 9/2004 | Sandyk et al. | 600/9 |
| 2004/0196285 A1 * | 10/2004 | Rice et al. | 345/423 |
| 2005/0093873 A1 * | 5/2005 | Paltashev et al. | 345/581 |
| 2005/0134945 A1 * | 6/2005 | Gallagher | 358/527 |
| 2005/0243094 A1 * | 11/2005 | Patel et al. | 345/506 |
| 2006/0227144 A1 * | 10/2006 | Bleiweiss | 345/502 |

OTHER PUBLICATIONS

Pascucci, V., "Isosurface Computation Made Simple: Hardware Acceleration, Adaptive Refinement and Tetrahedral Stripping", Eurographics/IEEE TVCG Symposium on Visualization (VisSym), pp. 293-300. EG/IEEE, May 19-21, 2004.*
Green S.: "Next generation games with direct3d 10", Game Developer Conference (Mar. 23-27, 2006), pp. 1-50.*
Reck, et al., "Realtime Isosurface Extraction with Graphics Hardware", Eurographics 2004, Short Presentations and Interactive Demos, pp. 33-36, INRIA and Eurographics Association, Grenoble, France, Aug. 30-Sep. 3, 2004.*
Akeley, K., "Reality Engine graphics", Proceedings of the 20th Annual Conference on Computer Graphics and interactive Techniques, Aug. 2-6, 1993, SIGGRAPH '93. ACM, New York, NY, pp. 109-116.*
Bleiweiss, A., 2005, "GPU shading and rendering", ACM SIGGRAPH 2005 Courses, Jul. 31-Aug. 4, 2005), SIGGRAPH '05, Chapter 3, Shading Compilers, ACM, New York, NY, pp. 1-24.*

(Continued)

*Primary Examiner* — Ulka Chauhan
*Assistant Examiner* — Roberta Prendergast
(74) *Attorney, Agent, or Firm* — Cooley LLP

(57) ABSTRACT

A graphics system utilizes a graphics processing unit to implement marching tetrahedra extraction of an isosurface. In one embodiment locations of tetrahedral grids are represented as groups of four vertices for processing in the graphics processing unit.

9 Claims, 12 Drawing Sheets

OTHER PUBLICATIONS

Blythe, D. 2006, "The Direct3D 10 system", ACM Transactions on Graphics, vol. 25, Issue 3, Jul. 2006, pp. 724-734.*

Cignoni, p. et al., "Adaptive tetrapuzzles: efficient out-of-core construction and visualization of gigantic multiresolution polygonal models", ACM Transactions on Graphics, vol. 23, issue 3 (Aug. 2004), pp. 796-803.*

Dietrich, et al., "Introduction to the DirectX 9 Shader Models", Game Developer Conference (Jan. 2003), pp. 1-85.*

Gregorski, et al., "Interactive view-dependent rendering of large isosurfaces", Proceedings of the Conference on Visualization '02 (Oct. 27-Nov. 1, 2002), IEEE Computer Society, Washington, DC, pp. 475-484.*

Klein, et al., "Hardware-accelerated reconstruction of polygonal isosurface representations on unstructured grids," Proceedings 12th Pacific Conference on Computer Graphics and Applications, Oct. 6-8, 2004, pp. 186-195.*

Lorensen, W. E. and Cline, H. E., "Marching cubes: A high resolution 3D surface construction algorithm", SIGGRAPH Computer Graphics, vol. 21, issue 4 (Aug. 1987), pp. 163-169.*

Mental Ray Version 3.0, Copyright 2001, 73 pages, http://www.uni-duesseldorf.de/URZ/hardware/parallel/local/xsi/XSI_html/files/mental_ray/manual/index.html.*

Molnar, et al., Jul. 1992, "PixelFlow: high-speed rendering using image composition", Proceedings of the 19th Annual Conference on Computer Graphics and interactive Techniques J. J. Thomas, Ed., SIGGRAPH '92. ACM, New York, NY, pp. 231-240.*

Raskar, R., 2001. Hardware support for non-photorealistic rendering. In Proceedings of the ACM SIGGRAPH/EUROGRAPHICS Workshop on Graphics Hardware (Los Angeles, California, United States). HWWS '01. ACM, New York, NY, 41-47.*

Röttger, et al., "Hardware-accelerated volume and isosurface rendering based on cell-projection", Proceedings of the Conference on Visualization '00, 2000, IEEE Visualization. IEEE Computer Society Press, Los Alamitos, CA, 109-116.*

Shiue, et al., "Mesh mutation in programmable graphics hardware", Proceedings of the ACM SIGGRAPH/EUROGRAPHICS Conference on Graphics Hardware, pp. 15-24, Jul. 2003.*

Sarah Tariq, "DirectX10 Effects," SIGGRAPH 2006, Jul. 2006, http://developer.download.nvidia.com/presentations/2006/siggraph/dx10-effects-siggraph-06.pdf.*

Westermann, R. and Ertl, T., "Efficiently using graphics hardware in volume rendering applications", Proceedings of the 25th Annual Conference on Computer Graphics and interactive Techniques SIGGRAPH '98, Jul. 1998, ACM, New York, NY, 169-177.*

B.P. Carneiro, C. Silva, A.E. Kaufman, "Tetra-cubes: an algorithm to generate 3d isosurfaces based upon tetrahedral", Anais do IX, SIBGRAPI (Oct. 1996) pp. 205-210.*

Frank Goetz, Theodor Junklewitz, and Gitta Domik., "Real-time marching cubes on the vertex shader", Eurographics 2005 Short Presentations, Eurographics Association, Aug. 2005, 4 pages.*

Johansson, G. and Carr, H. 2006., "Accelerating marching cubes with graphics hardware", Proceedings of the 2006 Conference of the Center for Advanced Studies on Collaborative Research, Toronto, Ontario, Canada, Oct. 16-19, 2006, CASCON '06, ACM, New York, NY, Article 39, 6 pages.*

A. Lovesey, "A Comparison of Real Time Graphical Shading Languages", University of New Brunswick Canada, CS4983 Senior Technical Report, Mar. 26, 2005, 70 pages, http://scholar.google.com/scholar?cluster=1158069024545843559&hl=en&as_sdt=2001.*

Bleiweiss A., Preetham A.: "Ashli-Advanced shading language interface",.ACM SIGGRAPH Course Notes, Jul. 27-31, 2003, 21 pages. http://www.ati.com/developer/SIGGRAPH03/AshliNotes.pdf.*

R. Fernando and M. Kilgard, "The Cg Tutorial: The Definitive Guide to Programmable Real-Time Graphics", Addison-Wesley, 2003, 104 pages.*

J. M. Hjelmervik and Hagen T. R., "GPU-Based Screen Space Tessellation", in Mathematical Methods for Curves and Surfaces: Tromsø, Jul. 1-6, 2004, M. Dæhlen, K. Mørken, and L. L. Schumaker (eds.), Nashboro Press, Jan. 2005, pp. 1-9.*

Vallance, S. and Calder, P., "Rendering multi-perspective images with trilinear projection", Proceedings of the 29th Australasian Computer Science Conference, vol. 48, Jan. 16-19, 2006, V. Estivill-Castro and G. Dobbie, Eds. ACM International Conference Proceeding Series, vol. 171. Australian Computer Society, Darlinghurst, Australia, 9 pages.*

Patrick Brown, "NV_geometry_program4", Nov. 6, 2006, Version 6, OpenGL Registry website, 23 pages, retrieved Dec. 17, 2010 from: http://web.archive.org/web/20071222070151/http://www.opengl.org/registry/specs/NV/geometry_program4.txt.*

Patrick Brown, "EXT_geometry_shader4", Jan. 10, 2007, Version 16, OpenGL Registry website, 34 pages, retrieved Dec. 17, 2010 from: http://web.archive.org/web/20071016071034/http://opengl.org/registry/specs/EXT/geometry_shader4.txt.*

Brian Paul, "Using OpenGL Extensions", Course 24, SIGGRAPH 1997, Jul. 1997, 12 pages, retrieved Dec. 17, 2010 at: http://www.mesa3d.org/brianp/sig97/exten.htm.*

Bourke, Paul "Polygonising a Scalar Field Using Tetrahedrons" http://local.wasp.uwa.edu.au/~pbourke/modelling/polytetra// Jun. 1997, pp. 1-5.

Marching Cubes, http://www.siggraph.org/education/materials/HyperVis/vistech/volume/surface4.htm, pp. 1-3, Feb. 1999.

Doi, Akio, et al. "An Efficient Method of Triangulating Equi-valued Surfaces by using Tetrahedral Cells," *IEICE Transactions*, vol. E74, No. 1, Jan. 1991, pp. 214-224.

Gueziec; Andre, et al. "Exploiting Triangulated Surface Extraction using Tetrahedral Decomposition," *IEEE Transactions on Visualization and Computer Graphics*, vol. 1, No. 4, Dec. 1995, pp. 328-342.

* cited by examiner

The 15 Cube Combinations

Triangles with adjacency

ISOSURFACE EXTRACTION UTILIZING A GRAPHICS PROCESSING UNIT

FIELD OF THE INVENTION

The present invention is generally related to extracting surface information from a three-dimensional field of values. More particularly, the present invention is directed towards utilizing a graphics processing unit to perform isosurface polygonization.

BACKGROUND OF THE INVENTION

There are many applications in medical imaging, science, and engineering for which there is a need to extract surface information from a three-dimensional field of values. In many applications it is desirable to visually represent information within three-dimensional fields of scalar values as isosurfaces. An isosurface, S, is a set of points on a scalar three-dimensional field having a constant value. That is, an isosurface S is a set of points for which f(x,y,z)=constant, where f(x,y,z) is a scalar three-dimensional function which is a function of coordinates x, y, and z. Such an isosurface is also sometimes called an implicit surface because the equation f(x,y,z)=constant defines an implicit function relating x, y, and z. As illustrative examples, the scalar three-dimensional function f(x,y,z) may be a mathematical formula or a scattered data array.

As illustrative examples of isosurfaces, an isosurface may represent a surface of constant pressure, temperature, velocity, or density. For example, in medical imaging isosurfaces are sometimes used to represent regions of constant density in a three-dimensional scan. Isosurfaces are important visualization tools in medical imaging, science visualization, and hydrodynamics. Isosurfaces also have many potential applications in three-dimensional graphics games and entertainment. As one example, metaballs are sometimes used to model fluids and also to generate special graphics effects. A metaball is defined by an implicit meatball function in which a threshold value defines a solid volume about a central point $x_0$ $y_0$ $z_0$. For example, a meatball can be defined by an equation $1/((x-x_0)^2+(y-y_0)^2+(z-z_0)^2)$=threshold. Metaballs are useful for representing soft, blobby objects that blend into each other. Metaballs can be visualized using isosurfaces.

A variety of algorithms have been developed to calculate polygonal mesh representations of isosurfaces using software algorithms executing on a central processing unit (CPU). These include techniques which work in a divide-and-conquer fashion in which groups of adjacent samples points associated with corners of a three-dimensional cell (or subcell) are tested to determine if the corner points lie inside or outside of a surface to be displayed. These include the marching cubes algorithm and the marching tetrahedral algorithm. The marching cubes algorithm is described in the article by Lorensen et al., "Marching Cubes": A High Resolution 3D Surface Construction Algorithm," Computer Graphics, 21 (4):163-169, July 1987, the contents of which are hereby incorporated by reference. The marching tetrahedron algorithm is a variation of the marching cubes algorithm using tetrahedrons instead of cubes and is described in various articles such as the article by Doi et al. "An Efficient Method of Triangulating Equivalued Surfaces by using Tetrahedral Cells," IEICE Transcations Communication, Elec. Info. Syst, E74(1) 214-224, January 1991 and the article by Gueziec et al. "Exploiting Triangulated Surface Extraction using Tetrahedral Decomposition," IEEE Transactions on Visualization and Computer Graphics, 1 (4) 328-342, December 1995, the contents of each of which are hereby incorporated by reference.

The marching cubes algorithm is a well-known method for scalar field polygonization. The marching cubes algorithm analyzes the scalar field along a sequence of cubes, where each cube has eight sample locations at the corners of the cube. The marching cubes algorithm determines at each corner of a cube whether the corner lies inside or outside of the isosurface. The marching cubes algorithm determines the polygon(s) required to represent the isosurface passing through the cube. Referring to FIG. 1, in the marching cubes algorithm a function f(x, y, z) is sampled on a cubic lattice. For each cubic cell, the marching cubes algorithm utilizes linear interpolation to estimate where the isosurface intersects cell edges. Tessellation is then performed depending upon the values of f(x,y,z) at the cell vertices to generate the polygon(s) of the isosurface passing through the cubic cell. The marching cubes algorithm has precalculated arrays supporting 256 different polygon configurations (i.e., with eight corners per cube, there are $2^8$=256 possible corner configurations). That is for each cube cell there are 256 different ways for an isosurface to intersect the cell. However, the 256 different polygon configurations can be derived from 15 unique cases using operations such as reflections and rotations. FIG. 2 illustrates the 15 unique cube combinations for the marching cubes algorithm.

The marching tetrahedra algorithm is similar to the marching cube algorithm except that the sampling grid that has cubes decomposed into a tetrahedron mesh. A cube can be split several different ways into a set of tetrahedra. These include implementations in which five or six tetrahedera cover the volume of a cube. As illustrated in FIG. 3, the marching tetrahedra algorithm results in either one or two triangles per tetrahedral intersecting the isosurface.

As previously described, conventionally the marching cubes and marching tetrahedra algorithms are implemented on a CPU. As a result, in the prior art the polygonization of isosurfaces consumed substantial CPU resources. Moreover, the complex nature of marching cubes and marching tetrahedra computations make it difficult to optimize them for rapid execution on a CPU.

Therefore, in light of the above described problem, the apparatus, system, and method of the present invention was developed.

SUMMARY OF THE INVENTION

A graphics system utilizes a graphics processing unit to perform isosurface extraction via a marching tetrahedra technique. Individual tetrahedrons are represented by groups of four vertices and processed in a graphics processing unit to perform isosurface extraction.

One embodiment of a graphics system for polygonizing isosurfaces includes a graphics processing unit. The graphics processing unit includes a vertex shader to shade vertices. A geometry shader receives vertices from the vertex shader and supports the simultaneous processing of groups of at least four vertices at a time. A raster stage rasterizes primitives received from the geometry shader. A pixel shader shades pixel fragment received from the raster stage. A memory stores a three-dimensional application supporting isosurface visualization software in which sample locations of tetrahedral grids are represented as groups of four vertices for processing in said graphics processing unit with the vertex shader determining at least one scalar field attribute for each vertex associated with a tetrahedron and the geometry shader generating at least one polygon for an isosurface determined by the geometry shader to intersect a tetrahedral grid,

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
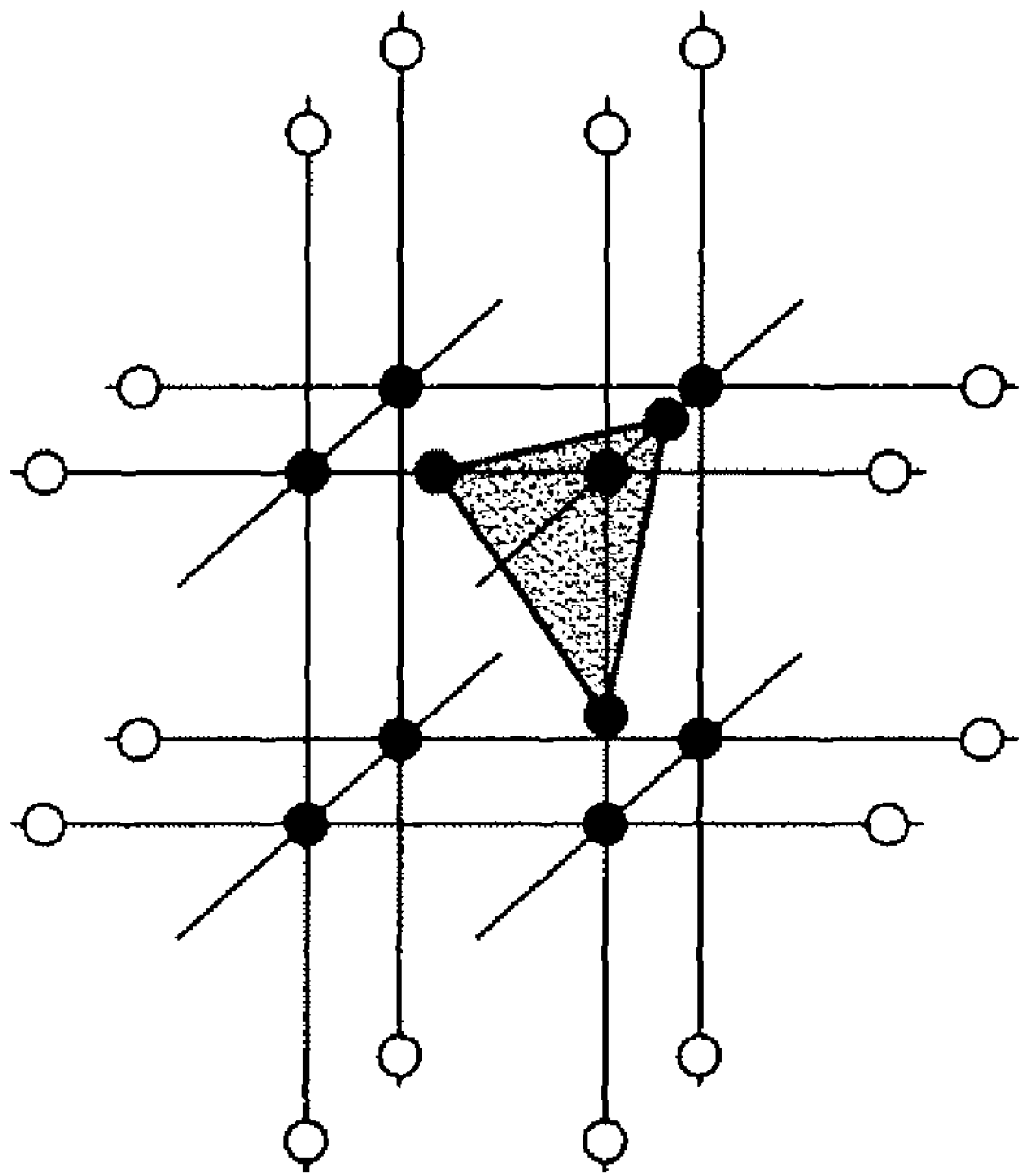
FIG. 1 illustrates the marching cubes algorithm in accordance with the prior art.
Figure 2:
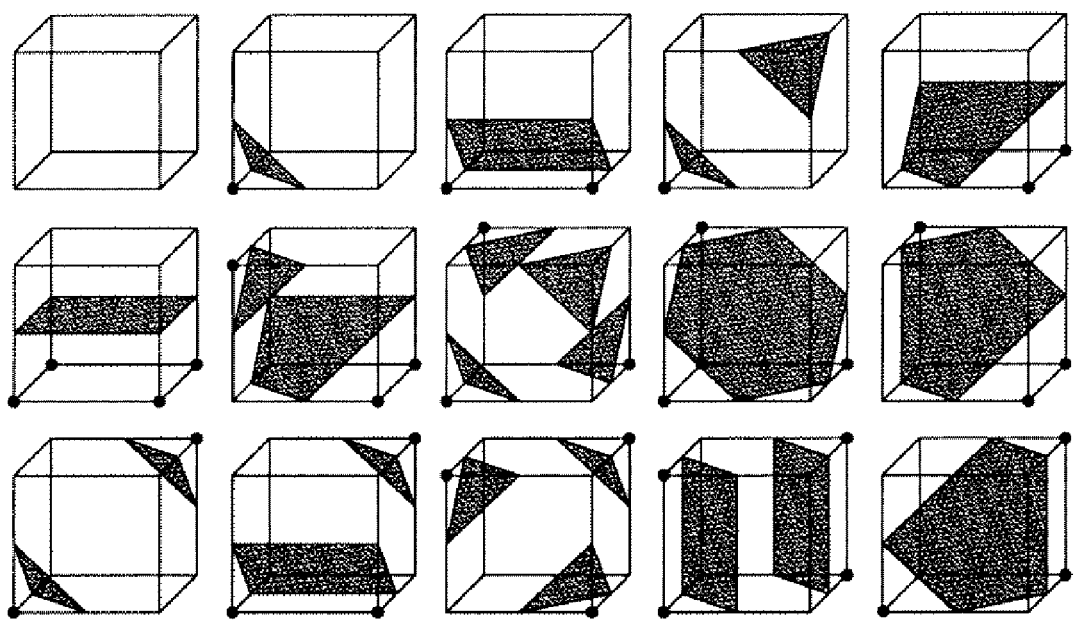
FIG. 2 illustrates unique cube combinations for the marching cubes algorithm in accordance with the prior art.
Figure 3:
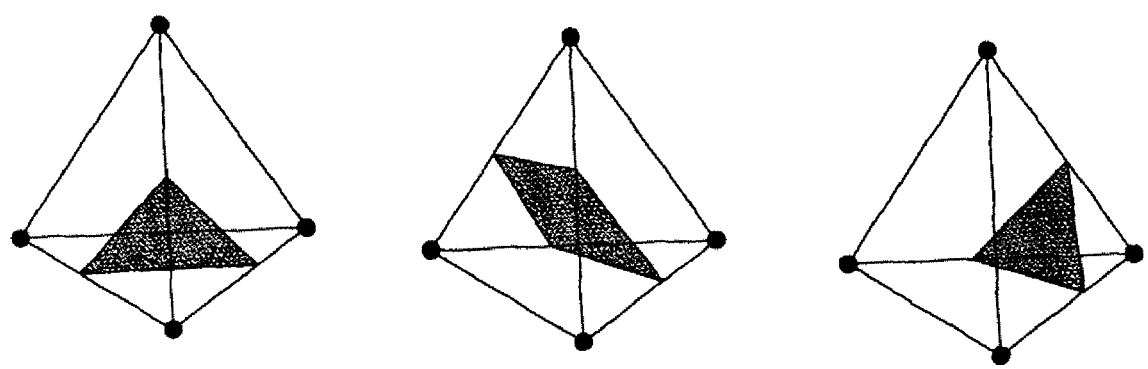
FIG. 3 illustrates that the marching tetrahedra algorithm results in either one or two triangles per tetrahedral intersecting the isosurface.
Figure 4:
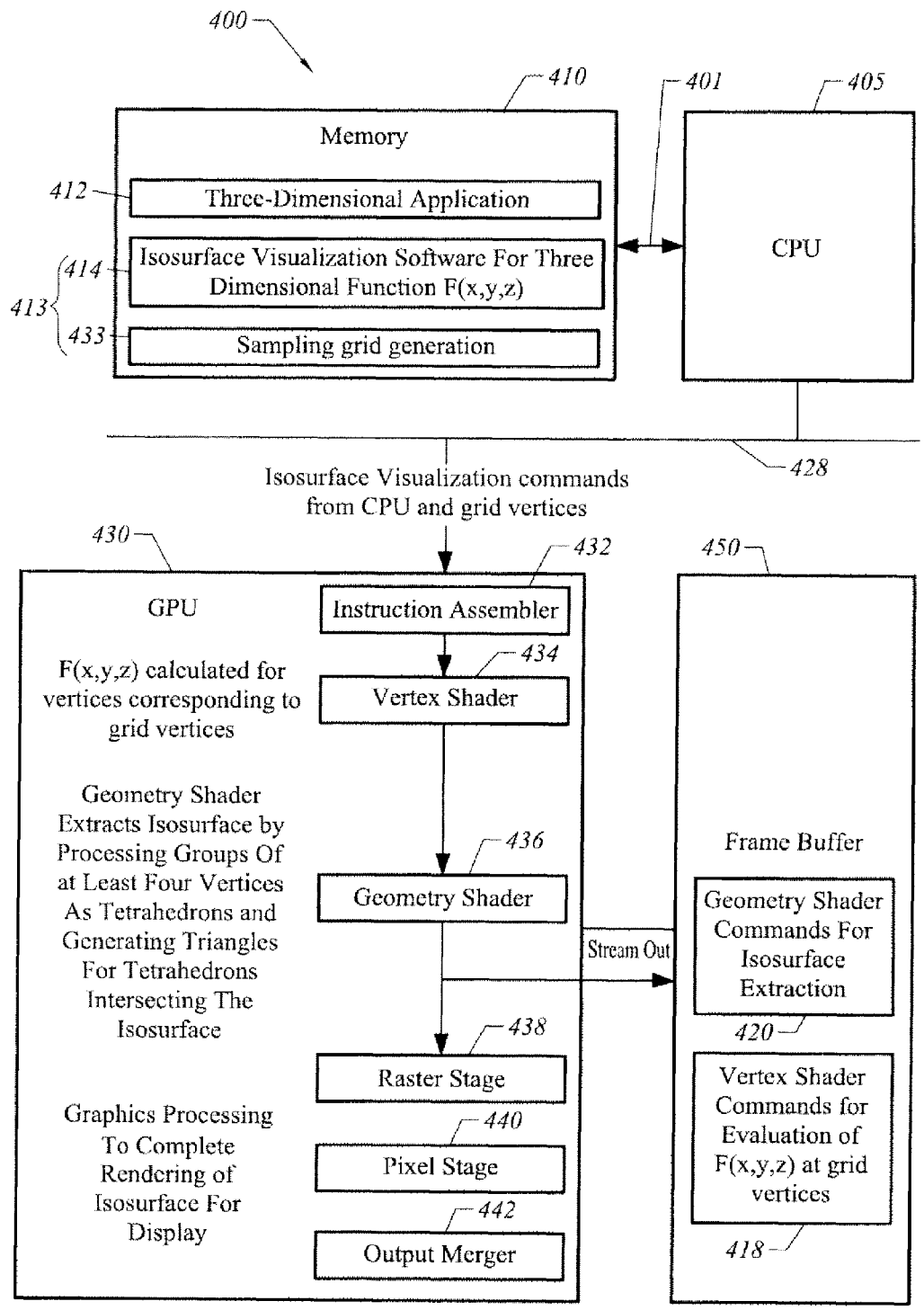
FIG. 4 illustrate a graphics system for visualizing isosurfaces in accordance with one embodiment of the present invention.

FIG. 4 illustrates a graphics system 400 for visualizing isosurfaces. A memory 410 stores computer software programs 412 and 413 executable on central processing unit (CPU) 405. A communications path 401 is provided to support communication between memory 410 and CPU 405. A three-dimensional application 412 generates data necessary for subsequent computation of a three-dimensional scalar function f(x,y,z), where x, y, and z are three spatial coordinates. As illustrative examples, three-dimensional application 412 may be a physics simulation program, a fluid dynamics program, a medical imaging program, or a three-dimensional graphics game.

Computer software programs 413 are provided to support isosurface visualization using a graphics processing unit (GPU) 430, i.e. to extract an isosurface from a three-dimensional scalar function for display using graphics processing unit (GPU) 430 to perform the isosurface polygonization. For the purposes of illustrating aspects of the present invention, software programs 413 include isosurface visualization software 414 and a sampling grid generation module 433 for sampling grid generation, which may include vertex swizzling and/or post projection space tessellation. However, depending upon implementation, the computer programs 413 that support isosurface polygonization may have their functionality residing in different locations, such as in subroutines of three-dimensional application 412, driver programs, or discrete software application. Additionally, as described below in more detail, various aspects of computer programs 413 may be implemented using Application Programmable Interfaces (APIs).

GPU 430 receives isosurface visualization commands and grid vertices from CPU 405 via a communication path 428 which may, for example, include one or more buses and/or bridges. A GPU memory 450 stores vertex shader commands 418 to calculate scalar function values at grid points and geometry shader commands 420 for isosurface extraction. That is, vertex and geometry shader commands are located in GPU memory 450 and executed by GPU 430. GPU 430 supports a mode of operation in which groups of at least four vertices can be simultaneously operated upon for geometry processing. In one embodiment GPU 430 has an instruction assembler 432, vertex shader 434, geometry shader 436, raster stage 438, pixel stage 440, and output merger stage 442 compliant with a DirectX® 10 (DX10) architecture. DirectX® is a family of APIs directed to tasks related to multimedia and games on Microsoft platforms. DX10 requires a DX10-capable graphics card and the Microsoft Vista Operating System (OS). DX10 includes a geometry shader 436 that has command inputs that define geometric primitives, such as triangles, points, and lines.

Figure 5:
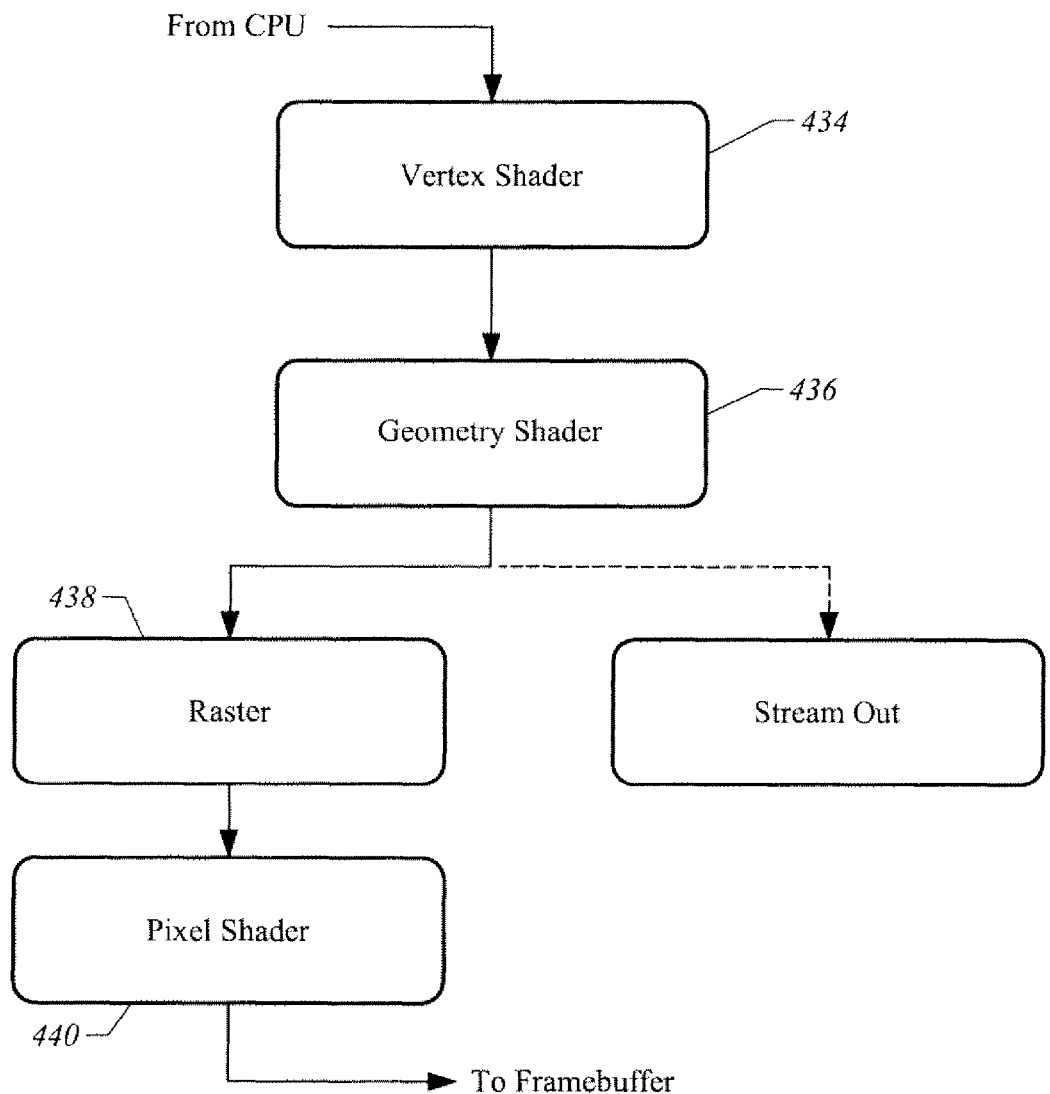
FIG. 5 illustrates a DX10 architecture in accordance with the prior art.
Figure 6:
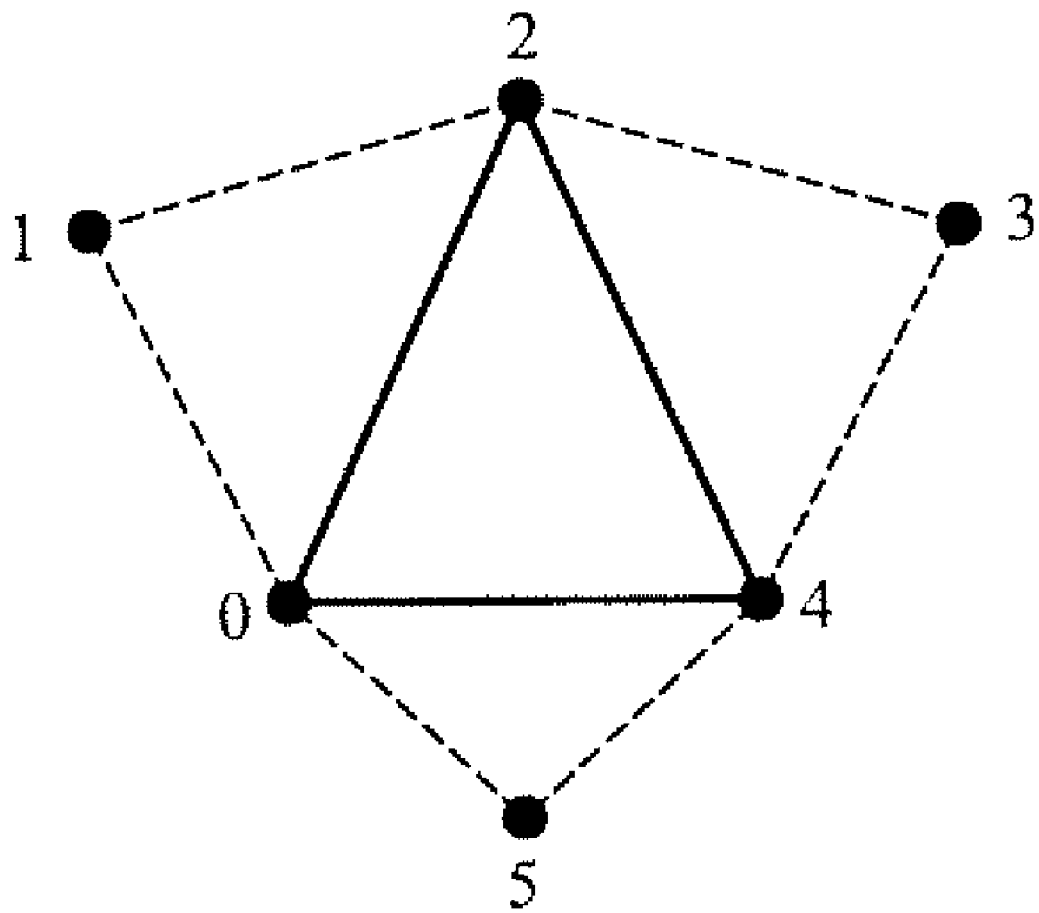
FIG. 6 illustrates DX10 triangles of adjacency in accordance with the prior art.
Figure 7:
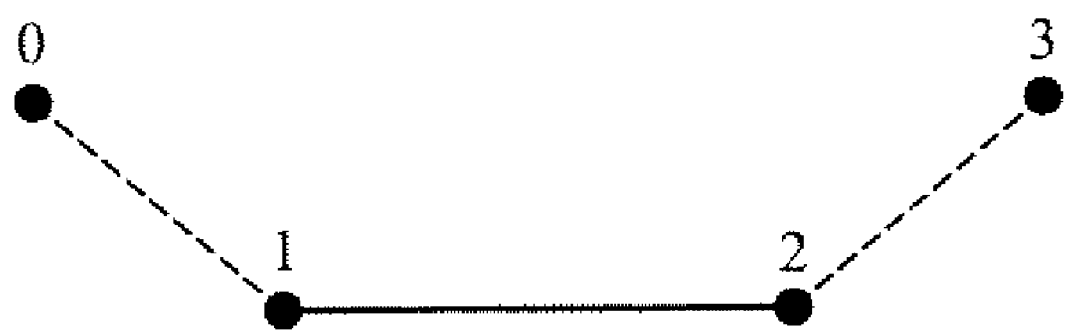
FIG. 7 illustrates DX10 lines with adjacency in accordance the prior art.

One aspect of DX10 is that primitives can be processed in the context of information on adjacency primitives. The highly parallel nature of graphics processors has, until recently, required the processing of triangles (after vertex shading) as isolated groups of three vertices with no contextual information on adjacent primitives. Similarly, until recently lines were processed (after vertex shading) as isolated lines of two vertices with no contextual information on adjacent lines. As illustrated in FIG. 5, the DX10 architecture includes a geometry shader. Associated DX10 APIs are included in DX10 to support processing primitives using additional contextual information on adjacent primitives. As illustrated in FIG. 6, for the case of triangles with adjacency, the DX10 API permits six vertices to be processed by a geometry shader as a group to correspond to a triangle and three adjacent triangles. As illustrated in FIG. 7, for the case of lines with adjacency, the DX10 API permits four vertices to be processed by a geometry shader as a group corresponding to a line segment and two adjacent lines. As described below in more detail, the inventor of the present application has recognized, however, that these DX10 APIs can be utilized for a different purpose, namely processing a group of four vertices to represent a tetrahedron for marching tetrahedra extraction of an isosurface within a graphics processing unit. Additionally, recently the Nvidia Corporation of Santa Clara, Calif. has developed an OpenGL® extension which permits a geometry shader functionality to be implemented in graphics hardware supporting the extensions NV_geometry_program4 or EXT_geometry-_shader4. Consequently, while DX10 is an illustrative example, it will be understood throughout the following discussion that other techniques in which groups of at least four vertices may be processed as a group to represent a tetrahedron are contemplated as being within the scope of the present invention.

Referring back to FIG. 4, software programs 413 are executed on CPU 405 and generate a sequence of commands and a stream of vertices that are received by GPU 430. For example, the stream of input vertices may be implemented using vertex arrays. To perform isosurface visualization, the set of input vertices is chosen to correspond to scalar field sample locations. The vertex shader 434 executes commands which instruct it to transform the vertices and compute the three-dimensional scalar function f(x,y,z) at the grid vertices. In one embodiment the vertex shader 434 samples the scalar field at the grid vertices and outputs scalar field potential along with in/out flags as per-vertex attributes. The in/out flags describe whether a vertex is inside or outside of the isosurface. Geometry shader 436 receives the shaded vertices and processes groups of at least four vertices corresponding to a three-dimensional sub-cell. In particular, in one implementation geometry shader 436 processes groups of four vertices that are selected to represent a tetrahedron. For example in DX-10 an API command for a line adjacency (line adj) group can be treated as a quad group of four vertices and thus used to represent a tetrahedron (which has four vertices). In this embodiment, the cells of the sample grids are subdivided into a set of tetrahedra which are processed by geometry shader 436. Geometry shader 436 then performs steps to extract the isosurface by, for example, estimating where the isosurface intersects the grid edge of the tetrahedron, interpolating along the edges of the tetrahedron as appropriate, and outputting 0, 1, or 2 triangles depending on the local topology of the isosurface at the tetrahedron. As described below in more detail, an index structure may be constructed by geometry shader 436 from individual vertices' in/out flags to generate the triangles using tessellation. The generated triangles form the basis for polygonizing the isosurface. Downstream graphics processing units 438, 440, and 442 receive the triangles and perform graphics processing, such as rasterization and pixel shading, to render the isosurface for display.

Figure 8:
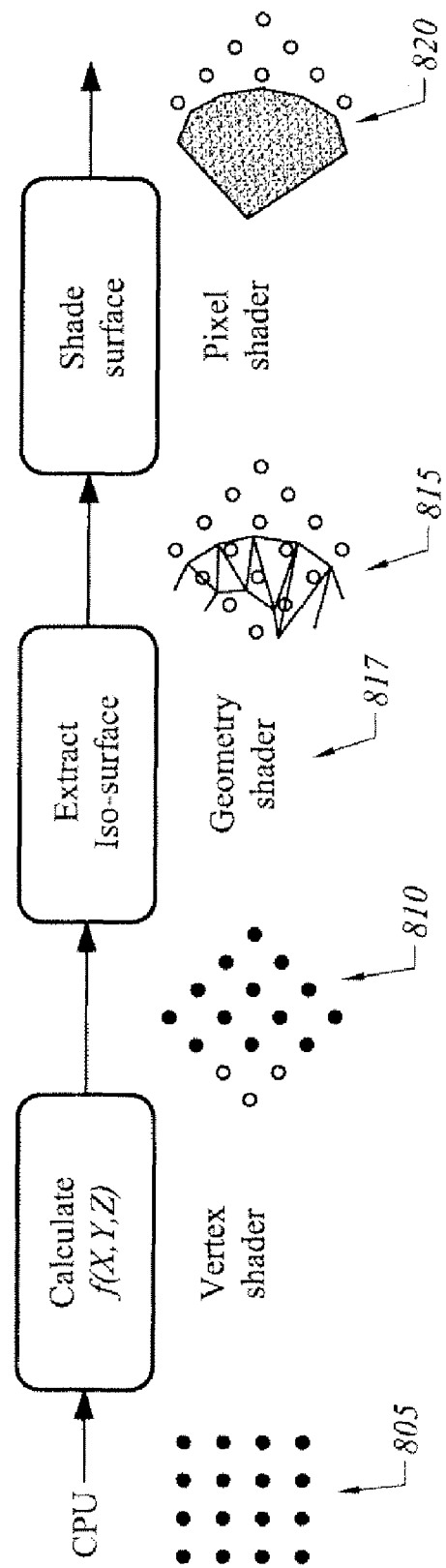
FIG. 8 illustrates aspects of a process for generating an isosurface in accordance with one embodiment of the present invention.

FIG. 8 illustrates graphically some of the steps of generating an isosurface. Vertex shader receives a vertex array 805 from the CPU corresponding to isosurface grid points (indicated by the square array of input vertices). The Vertex shader outputs vertices 810 that have been appropriately transformed and shaded such that the output vertices correspond to an evaluation of f(x,y,z) at the isosurface grid coordinates. The geometry shader 817 outputs triangles 815 that correspond to a polygonization of the isosurface, e.g., a sequence of triangles that can be joined together to form the isosurface. The pixel shader shades the triangles into a representation 820 of the isosurface.

Note that the present invention can utilize a variety of conventional sub-divisions of sampling grids into tetrahedrons. These include, for example, a sub-division along main diagonals of the sampling grid cells into six tetrahedra ("MT6"); a sub-division in which the sampling grid cell is tesselated into five tetrahedra ("MT5"); and body-centered tesselation ("CCL"). Alternatively, a simplex grid approach can be used in which the tetrahedral grid is generated directly.

Figure 9:
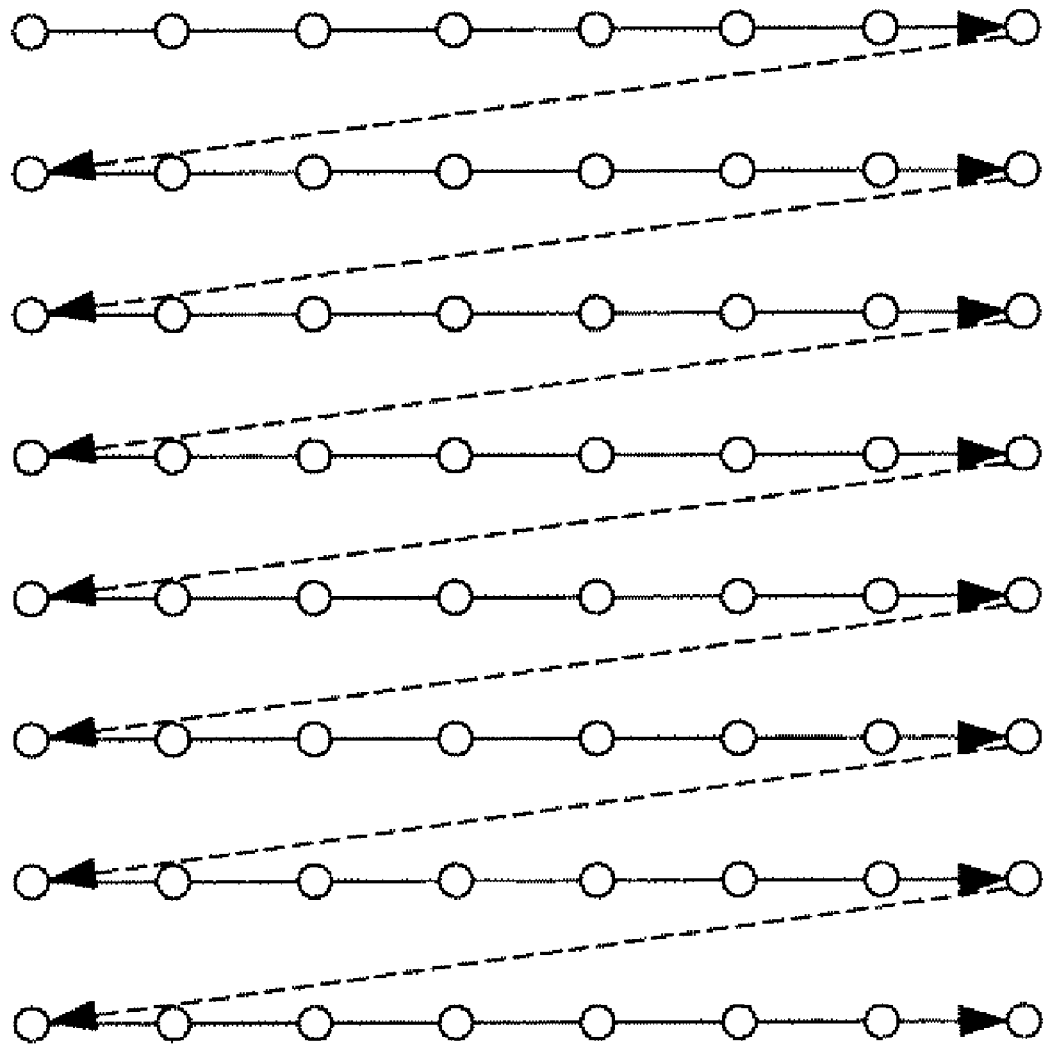
FIG. 9 illustrates a linear walk of vertices in accordance with one embodiment of the present invention.
Figure 10:
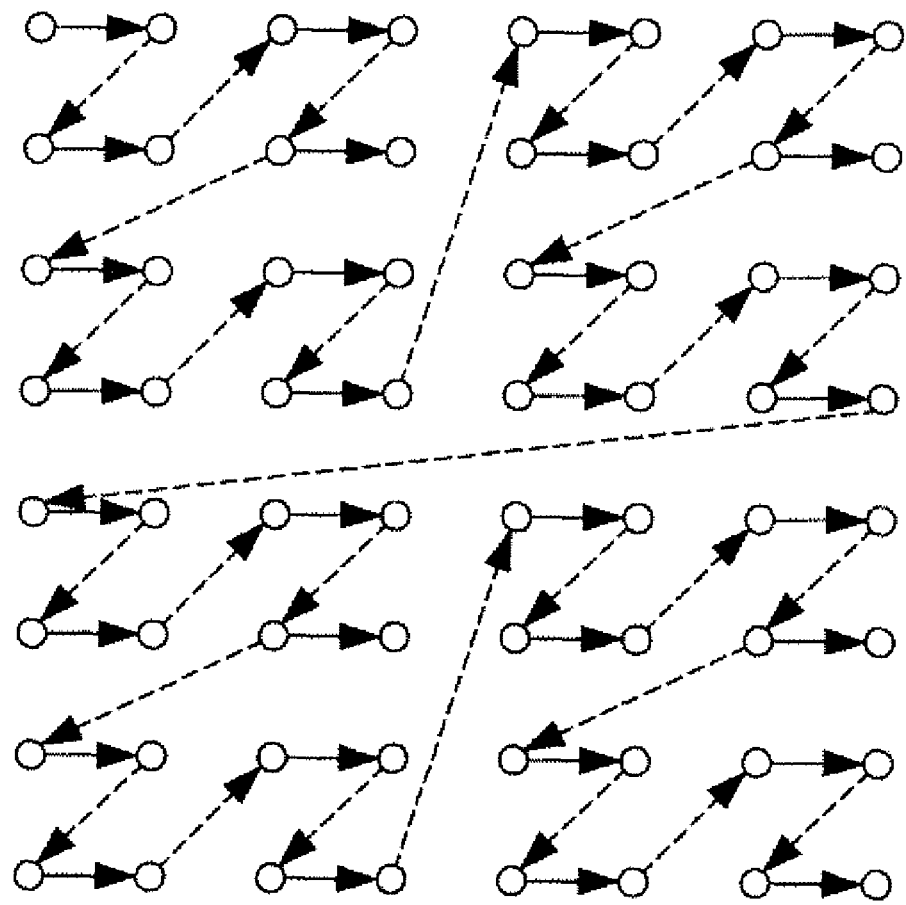
FIG. 10 illustrates a swizzled walk of vertices in accordance with one embodiment of the present invention.

In one embodiment, vertex swizzling of (x,y,z) vertices is supported by sampling grid generation module 433 to generate a more efficient walk order for processing vertices. Vertices are conventionally generated as a stream of vertices corresponding to a linear walk in a line-by-line basis, as indicated in FIG. 9. However, a disadvantage of a linear walk is that vertices of a tetrahedron may reference vertices from adjacent lines which are located at a significant distance away from each other in the stream, as indicated by the dashed lines of FIG. 9. This situation can result in inefficient use of a vertex cache. Some possible solutions include the use of a Hilbert curve or a swizzled walk to pre-transform the vertices into an improved order. As illustrated in FIG. 10, in one embodiment the x, y, and z bits are swizzled to generate a swizzled walk. For example to compute a swizzled output if $x=x_1x_0$, $y=y_3y_2y_1y_0$, and $z=z_2z_1z_0$, then a swizzling operation swizzle $(x, y, z)=y_3z_2y_2z_1x_1z_0y_0x_0$. The swizzling may be performed to generate vertex data arrays. In a DX10 embodiment, the vertices may also be pre-transformed using the StreamOut path (illustrated in FIG. 4). The swizzled walk walks vertices in groups of four in an order highly compatible with the geometry processor processing groups of four vertices.

Figure 11:
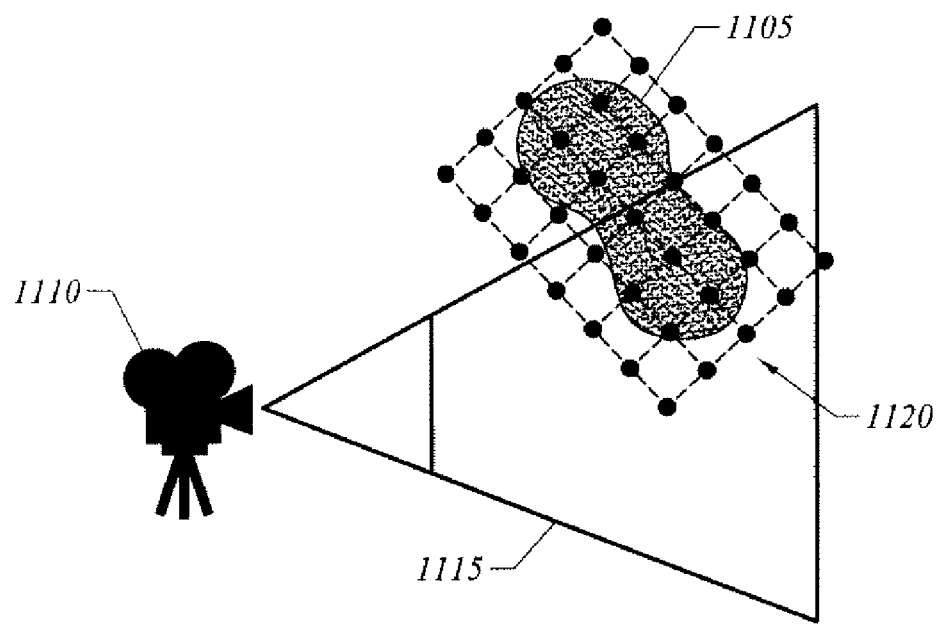
FIGS. 11-13 illustrate tessellation space embodiments.
Figure 12:
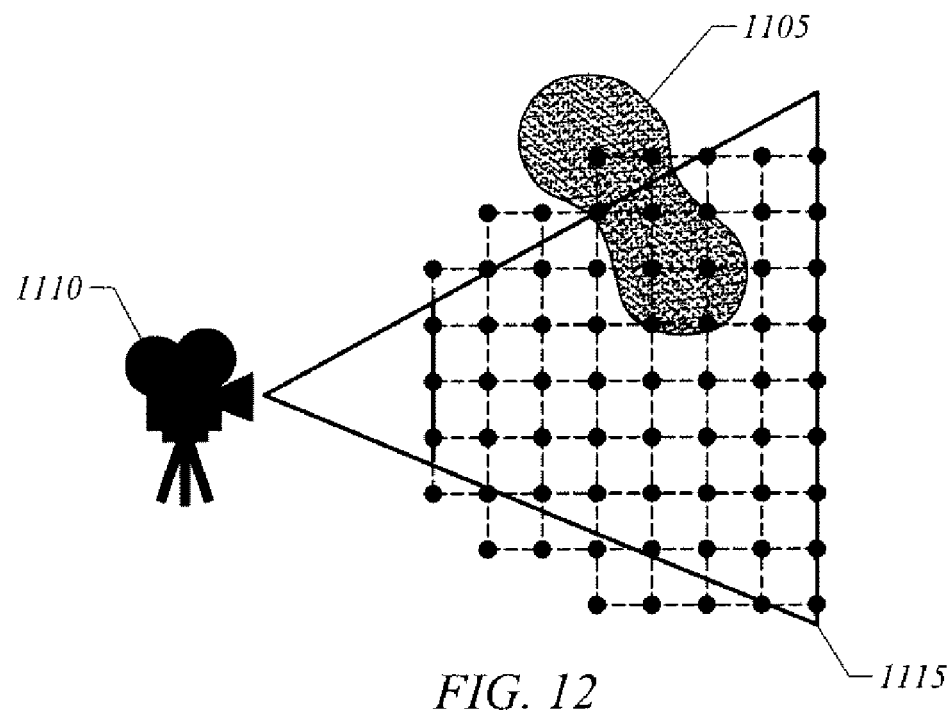
Figure 13:
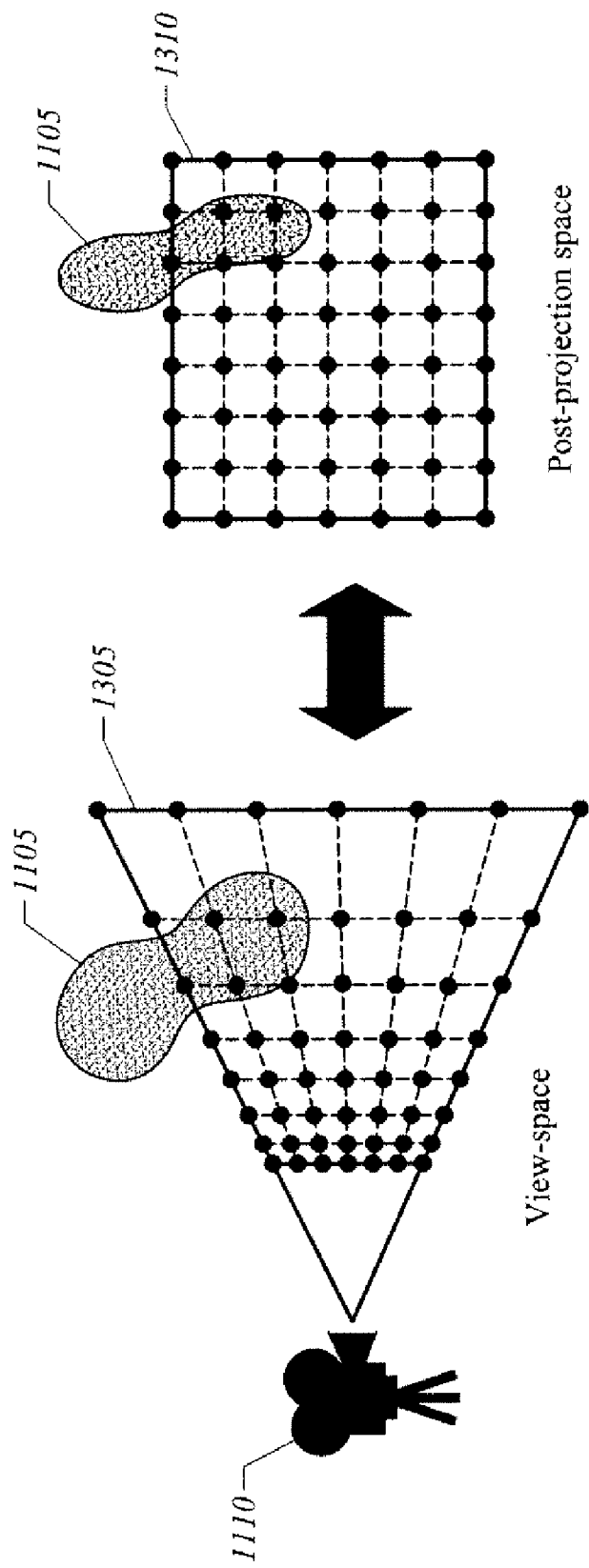

Referring to FIGS. 11-13, in one embodiment sampling grid generation module 433 generates the sampling grid in the space most appropriate for effective sampling. In a graphics system, there are several possible choices for selecting sample locations (points in FIGS. 11-13) of an isosurface 1105 with respect to a camera 1110 view frustum 1115. Referring to FIG. 11, in object space efficient allocation of sample locations is possible but has the disadvantage that it requires a calculation of a bounding box 1120. Referring to FIG. 12, an alternative is to use a view space to allocate sample locations. However, in view space the sampling rate is distributed inadequately. Referring to FIG. 13, one option is perform tessellation in post-projection space. Portion 1305 illustrates a view-space representation and portion 1310 represents the post-projection space. In the post-projection space the view frustum is an axis aligned box, i.e. the sampling grid is aligned with the camera frustum. This results in a better distribution of sampling density, which improves quality and performance.

One benefit of the present invention is that it exploits the highly parallel nature of a graphics processing unit to perform the most computationally intensive portions of a marching tetrahedral computation. Modern graphics processing units are highly parallel and typically support multiple instances (threads) of a geometry shader. Consequently, the polygonization of an isosurface can be performed efficiently in a single rendering pass compared with conventional approaches in which the marching tetrahedra computations are performed in a CPU. Other modifications and extensions are also contemplated, such as performing the marching cubes algorithm using two rendering passes. Additionally, it will be understood that the present invention may be practiced on any programmable graphics processing unit capable of processing groups of at least four vertices as a group.

It will be understood that there are variety of different ways that the functionality of the present invention may be programmed. For example, An exemplary set of vertex/geometry shader inputs and outputs includes sample position, scalar field gradients, scalar field value, and inside flag, a surface vertex position, and a surface normal. These inputs and output may be represented using a variety of data structures. Below is exemplary pseudocode for vertex and geometry shader inputs and outputs:

```
// Grid vertex struct SampleData {
float4 Pos:SV_POSITION; // Sample position
float3 N:NORMAL; // Scalar field gradient
float Field:TEXCOORD0; // Scalar field value
uint IsInside:TEXCOORD1; // "Inside" flag
};
// Surface vertex struct SurfaceVertex {
float4 Pos:SV_POSITION; // Surface vertex position
float3 N:NORMAL; // Surface normal
};
```

In one implementation, the geometry shader subroutine determines where an isosurface intersects a grid edge. Below is exemplary pseudocode for a geometry shader subroutine to determine a grid edge intersection:

```
// Estimate where isosurface intersects grid edge SurfaceVertex CalcIntersection(SampleData v0, SampleData v1) {
  SurfaceVertex o;
  float t=(1.0-v0.Field)/(v1.Field-v0.Field);
  o.Pos=lerp(v0.Pos, v1.Pos, t);
  o.N=lerp(v0.N, v1.N, t);
  return o;
}
```

As previously described, in a DX10 implementation a line adjacency API (lineadj) is used to interpret groups of four vertices as a tetrahedron. The following pseudocode illustrates an exemplary geometry shader which uses a pre-computed tessellation of a tetrahedron with respect to an edge table index, constructed from in/out flags of four input vertices:

```
void GS_TesselateTetrahedra(lineadj SampleData In[4],
inout TriangleStream<SurfaceVertex>Stream) {
// construct index for this tetrahedron
uint index =
(In[0].IsInside<<3) | (In[1].IsInside <<2) |
(In[2].IsInside<<1) | In[3].IsInside;
const struct {uint4 e0; uint4 e1;} EdgeTable[ ]={
    {0, 0, 0, 0, 0, 0, 0, 1}, // all vertices out
    {3, 0, 3, 1, 3, 2, 0, 0}, // 0001
    {2, 1, 2, 0, 2, 3, 0, 0}, // 0010
    {2, 0, 3, 0, 2, 1, 3, 1}, // 0011-2 triangles
    {1, 2, 1, 3, 1, 0, 0, 0}, // 0100
    {1, 0, 1, 2, 3, 0, 3, 2}, // 0101-2 triangles
    {1, 0, 2, 0, 1, 3, 2, 3}, // 0110-2 triangles
    {3, 0, 1, 0, 2, 0, 0, 0}, // 0111
    {0, 2, 0, 1, 0, 3, 0, 0}, // 1000
    {0, 1, 3, 1, 0, 2, 3, 2}, // 1001-2 triangles
    {0, 1, 0, 3, 2, 1, 2, 3}, // 1010-2 triangles
    {3, 1, 2, 1, 0, 1, 0, 0}, // 1011
    {0, 2, 1, 2, 0, 3, 1, 3}, // 1100-2 triangles
    {1, 2, 3, 2, 0, 2, 0, 0}, // 1101
    {0, 3, 2, 3, 1, 3, 0, 0}// 1110
};
// ... continued
// don't bother if all vertices out or all vertices in
if (index>0 && index<15)
{
    uint4 e0=EdgeTable[index].e0;
    uint4 e1=EdgeTable[index].e1;
    // Emit a triangle
    Stream.Append(CalcIntersection(In[e0.x], In[e0.y]));
    Stream.Append(CalcIntersection(In[e0.z], In[e0.w]));
    Stream.Append(CalcIntersection(In[e1.x], In[e1.y]));
    // Emit additional triangle, if necessary
    if (e1.z !=0)
        Stream.Append(CalcIntersection(In[e1.z], In[e1.w]));
}
}
```

In the above example, the edge table is based on identifying vertices that are inside or outside the isosurface. For a tetrahedron with vertices 0, 1, 2, and 3 the intersection of an isosurface with the tetrahedron can be defined with respect to the vertice(s) that are inside the isosurface and the edges that the isosurface intersects. For example, consider the edge table entry of {3, 0, 3, 1, 3, 2, 0, 0}, which has an index of 0001. The entry can be decomposed into vertex pairs (3,0); (3,1); (3,2) which define tetrahedron edge which intersect the isosurface. In this example, vertex 3 is inside the isosurface and vertices 0, 1, and 2 are outside of the isosurface.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using HLSL, GLSL, Cg, Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system for polygonizing isosurfaces, comprising:
a graphics processing unit, including:
   a vertex shader to shade vertices;
   a geometry shader receiving vertices from said vertex shader, said geometry shader utilizing a command supporting the simultaneous processing of groups of four vertices at a time with each group of four vertices selected to represent a respective tetrahedron;
   a raster stage to rasterize primitives received from said geometry shader; and
   a pixel shader to shade pixel fragments received from said raster stage;
a central processing unit; and
a memory coupled to said central processing unit, said memory storing a three-dimensional application and supporting isosurface visualization software in which sample locations of tetrahedral grids are represented as groups of four vertices for processing in said graphics processing unit with said vertex shader determining at least one scalar field attribute for each vertex associated with a tetrahedron and said geometry shader generating at least one polygon for an isosurface determined by said geometry shader to intersect a tetrahedral grid,
wherein said graphics processing unit is compliant with an OpenGL® processing architecture in which an OpenGL extension is used to implement the function of said geometry shader,
wherein said geometry shader performs tessellation in a post-projection space,
wherein said OpenGL extension is used to process groups of four vertices by said geometry shader,
wherein said OpenGL extension includes a command corresponding to at least one of NV_geometry_program4 and EXT_geometry_shader4.

2. The system of claim 1, wherein said graphics processing unit is compliant with a DirectX® 10 architecture.

3. The system of claim 1, wherein said geometry shader generates said at least one polygon using tessellation.

4. The system of claim 1, wherein said system performs a swizzling operation of vertices input to said graphics processing unit.

5. The system of claim 1, wherein said graphics processing unit is compliant with a DirectX® 10 architecture and a line adjacency command is used to process groups of four vertices in said geometry shader.

6. A non-transitory computer readable storage medium having computer readable instructions for causing a computer to generate an isosurface visualization, comprising:
   computer readable code for generating vertex shader commands to a graphics processing unit for evaluation of a three-dimensional scalar function at grid vertices;
   computer readable code for generating geometry shader commands to said graphics processing unit for performing marching tetrahedra extraction of an isosurface with the geometry shader utilizing a command to process groups of four vertices at a time with each group selected to represent a respective tetrahedron, wherein said graphics processing unit is compliant with an OpenGL® processing architecture in which an OpenGL extension is used to implement the function of said geometry shader; and
   computer readable code for generating commands to said graphics processing unit to perform post-projection space tessellation of triangles generated by said geometry shader,
   wherein said OpenGL extension is used to implement said command to process groups of four vertices,
   wherein said command corresponds to at least one of NV_geometry_program4 and EXT_geometry_shader4.

7. The computer readable medium of claim 6, further comprising computer readable code to perform vertex swizzling of vertices sent to said graphics processing unit.

8. The computer readable medium of claim 7, wherein said swizzling is selected to facilitate usage of a vertex cache.

9. The computer readable medium of claim 6, wherein said geometry shader commands include a DirectX® 10 line adjacency command.

* * * * *